(12) United States Patent
Arnborg

(10) Patent No.: US 6,433,271 B1
(45) Date of Patent: *Aug. 13, 2002

(54) METHOD FOR ARRANGING A BUSBAR SYSTEM AND A BUSBAR SYSTEM

(75) Inventor: Christer Arnborg, Gavle (SE)

(73) Assignee: ABB AB, Vasteras (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/875,570
(22) PCT Filed: Jan. 26, 1996
(86) PCT No.: PCT/SE96/00089
§ 371 (c)(1), (2), (4) Date: Jun. 22, 1998
(87) PCT Pub. No.: WO96/23337
PCT Pub. Date: Aug. 1, 1996

(30) Foreign Application Priority Data

Jan. 26, 1995 (SE) ............................................. 9500294

(51) Int. Cl.[7] .............................................. H02G 15/24
(52) U.S. Cl. .................................... 174/16.2; 174/21 R
(58) Field of Search ............................. 174/16.1, 16.2, 174/21 R, 28, 84 R, 88 R, 88 B, 70 B, 71 B, 72 B; 439/114, 210, 212, 213; 277/603, 608, 614; 285/381.3, 381.5

(56) References Cited

U.S. PATENT DOCUMENTS

| | | | |
|---|---|---|---|
| 3,585,271 A | 6/1971 | Reynolds et al. | 174/15 |
| 3,636,233 A | 1/1972 | Swampillai et al. | 174/16 B |
| 3,794,749 A | 2/1974 | Wharton | 174/28 |
| 3,804,970 A | 4/1974 | Oldman | 174/16 B |
| 3,944,716 A * | 3/1976 | Katzbeck et al. | 174/28 X |
| 4,038,486 A | 7/1977 | Meyer et al. | 174/28 |
| 4,283,079 A * | 8/1981 | Flaherty | 285/381 |
| 4,378,461 A | 3/1983 | Haginomori | 174/16 B |
| 4,424,411 A | 1/1984 | Clabburn | 174/84 R |
| 4,810,213 A | 3/1989 | Chabot | 439/825 |
| 5,117,066 A * | 5/1992 | Balsells | 174/35 GC |
| 5,649,923 A * | 7/1997 | Gregory et al. | 606/15 |
| 5,654,527 A * | 8/1997 | Ciobanu et al. | 174/88 B |

FOREIGN PATENT DOCUMENTS

| | | |
|---|---|---|
| DE | 2409484 | 4/1975 |
| DE | 3203106 | 8/1983 |
| JP | 2285909 | 11/1990 |

* cited by examiner

Primary Examiner—Chau N. Nguyen
(74) Attorney, Agent, or Firm—Hodgson Russ LLP

(57) ABSTRACT

In order to make switchgear equipped with a busbar system for high voltages/current strengths less space-consuming, and to simplify the jointing and connection of the busbars and therewith also simplify manufacture and assembly of the busbar system, the busbars of the system have been given the form of tubes. A tubular cylindrical busbar is jointed/connected with the aid of a conductive contact element (9) in the form of a ring-shaped coil spring located between the insertion end (6) of one tube and an insertion end (7) of an adjacent tube. As the insertion end carrying the spring is inserted into a receiving end of an adjacent tube when joining two tubes together, the spring is compressed and remains compressed while exerting a pressure and holding force on the two tube ends. The voltage and current through tubular busbars that have been jointed with the aid of the springs are affected minimally by the springs, because each turn of the coil spring provides several points of contact with each tube end, therewith providing essentially loss-free electrical transmission.

28 Claims, 4 Drawing Sheets

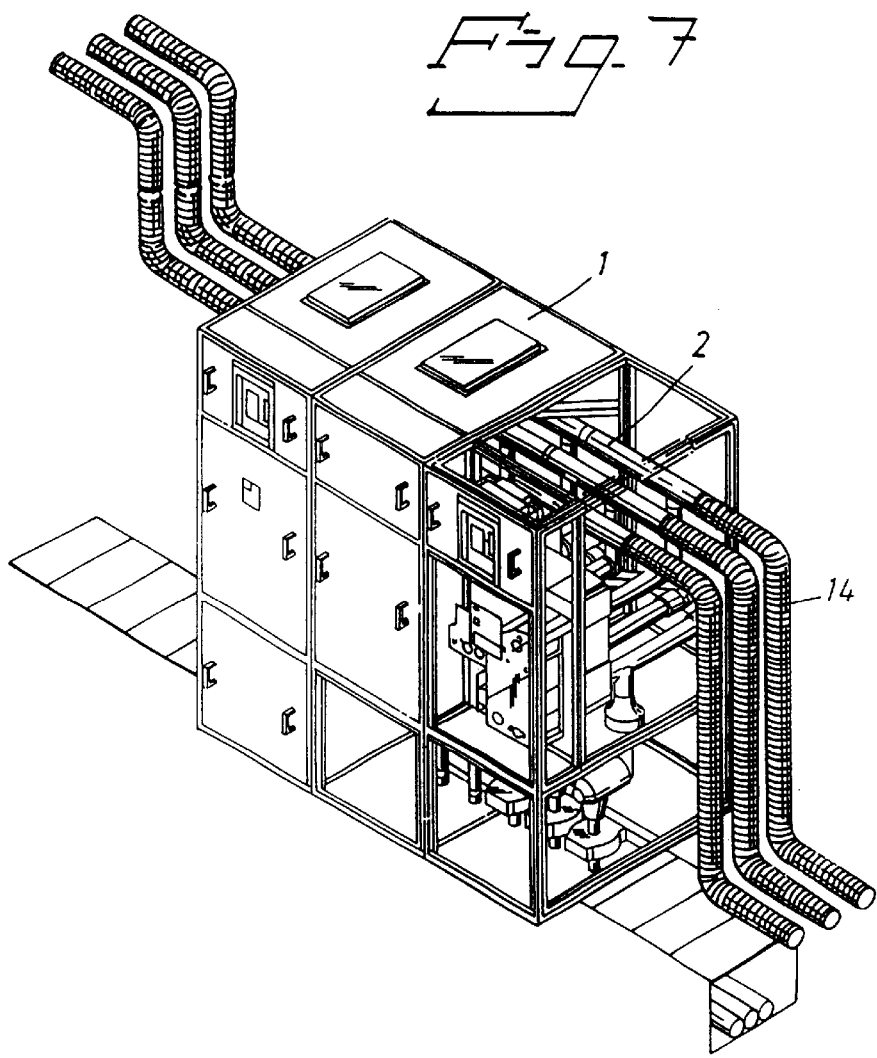
Fig. 7
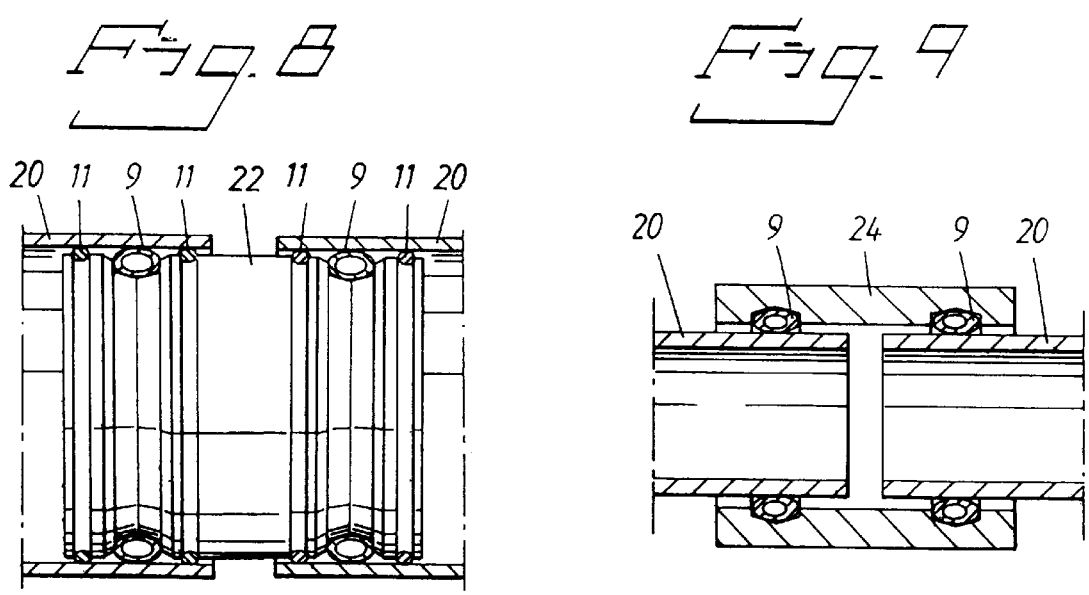
Fig. 8
Fig. 9

METHOD FOR ARRANGING A BUSBAR SYSTEM AND A BUSBAR SYSTEM

The present invention relates to a method of connecting and disconnecting the modules of air insulated switchgear, and a busbar system for enabling high voltages and/or high current strengths to be used in air insulated switchgear with a high degree of safety, for instance.

DESCRIPTION OF THE BACKGROUND ART

Air insulated switchgear intended for high voltages≧1 Kv and high current strengths are often equipped with flat busbars that have a high copper content and preferably a rectangular cross-section. The cross-sectional surface area of a busbar and its distance from another conductive material must be dimensioned in accordance with the voltage/current strength levels so that losses will be small and the risk of flashover reduced. Thus, in high voltage plants of the switchgear kind, a busbar system having a rectangular cross-section may require a relatively large amount of space in order to prevent the occurrence of flashover. The busbars are joined and connected by means of screw/nut joints, therewith creating contact surfaces between the busbars and respective jointing means. Conventional busbar systems are most often assembled and fitted by mechanics or like artisans, and the work involved is relatively laborious and time-consuming. AS a result, the work necessitated in connecting and disconnecting switchgear modules is complicated, time-consuming and dependent on the services of an artisan or mechanic.

SUMMARY OF THE INVENTION

With the intention of reducing the space requirements of air insulated switchgear having a busbar system for high voltages/high current strengths and simplifying jointing and connection of the busbar system and therewith simplifying the manufacture and fitting of the system, the busbars of the busbar system have been given the form of tubes which, when applicable, have welded/soldered thereto tubular connectors for connecting the system to contact breaker connections. The insertion end of one busbar tube has fitted on its insertion end an electrically conductive contact element in the form of an annular coil spring which is received and affixed in the receiving end of another busbar tube configured to this end, therewith enabling the tubular cylindrical busbar to be easily joined/connected together. As the spring-carrying insertion end of said busbar tube is inserted into the receiving end of the other tube, the spring is compressed and therewith exerts a pressure and holding force between the tubes while remaining in a compressed state. The coupling and holding force exerted between the insertion end of the one tube and the receiving end of the other tube can be improved by providing a groove in the inner surface of the said receiving end of the other tube, so that the spring is able to expand to some extent. The spring provides a large number of contact points with each tube end, therewith providing an efficient tube coupling and an essentially loss-free contact for electrical transmission purposes. A contact which is stable over a long period and with which the minimum of oxidation occurs can be obtained by protecting the contact points from the surrounding atmosphere with the aid of seals on both sides and by optionally greasing the enclosed volume. The use of tubes in air insulated switchgear enables the busbars to be disconnected cabinet-wise/unit-wise and also enables coupling means in the main current path to be removed without needing to loosen or remove fixed connections in the busbar system. Thus, in the assembly of switchgear different switchgear modules can be readily connected together by pushing the insertion ends of respective tubular busbars into the corresponding receiving ends of juxtaposed tubular busbars.

According to another embodiment of the present invention, there is used a tubular jointing element which is mounted on the outer ends of the tubular busbars. The jointing element may have the form of a tube provided with an electrically conductive contact element in the form of a ring-shaped coil spring fixed on the outer side of the jointing element, one coil spring at each end. The tubular busbars are joined together by pressing the spring-carrying jointing element into the tubular busbars to be joined together, therewith compressing the springs, which remain compressed and exert a pressing and holding force between the tubular busbars and the jointing element. The coupling strength and retaining strength of the joint can be improved by providing a groove on the inner surface of respective tubular busbars, so as to enable the springs to expand to some extent.

The jointing element may also have the form of a tube which includes an electrically conductive contact element in the form of a ring-shaped coil spring fixed on the inside of the jointing element, one coil spring at each end. In this case, the tubular busbars are pressed into the jointing element, therewith compressing the springs.

The joints produced in accordance with the present invention give a greater degree of reliability than conventional bolt joints, because they eliminate the risk of human error involved with earlier used bolt connections.

In the case of a tubular busbar system in air insulated switchgear intended for high voltages and high current strengths, the spacing between respective busbars can be made smaller than the spacing between the rectangular busbars of conventional busbar systems having rectangular cross-section with the same quantity of material per unit length, therewith obtaining switchgear with smaller outer dimensions. As a result of the skin effect among other things, i.e. the phenomenon by which high frequency currents tend to be confined to the thin skin of conductors, tubular busbars are able to conduct more current than a homogenous busbar having the same cross-sectional surface area, at the same time as the electrical power field becomes weaker around the busbar. The "electrode" effect that is liable to be obtained with conventional busbars and result in flashover is not obtained with a round busbar. The round shape is also retained in the joints when practicing the inventive jointing technique. Neither will soldering and welding of copper tubes with the aid of present-day techniques result in weakenings or negatively effect the electrical conductivity; on the contrary, the electrical resistance may be reduced in the region of the connection by the solder/weld.

Cooling air can be circulated through the tubular busbars of the described busbar system, either by forced circulation with the aid of a fan, or by natural circulation with the aid of upwardly and downwardly angled terminating means at both ends of the busbar system.

BRIEF DESCRIPTION OF THE DRAWINGS

FIG. 7 illustrates switchgear provided with a tubular busbar system in accordance with the invention, and also shows flexible cooling tubes connected to the busbars.

FIG. 8 illustrates the connection or jointing of tubular busbars provided with contact elements, sealing elements, and coupling means according to a first embodiment and forming part of a busbar system in accordance with the invention.

FIG. 9 illustrates the connection, or jointing of tube busbars provided with contact elements and coupling or jointing means in accordance with a second embodiment and forming part of a busbar system in accordance with the invention.

DESCRIPTION OF AN EXEMPLIFYING EMBODIMENT

Figure 1:
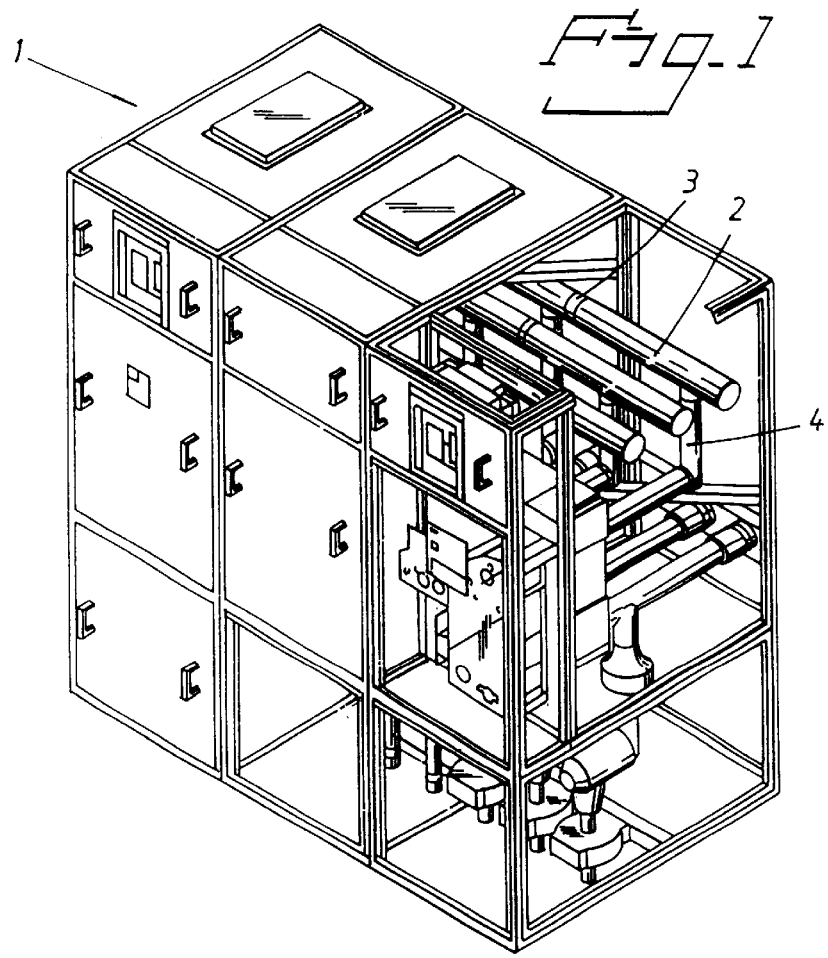
FIG. 1 illustrates air insulated switchgear having a busbar system comprised of tubes in accordance with the invention.
Figure 2A:
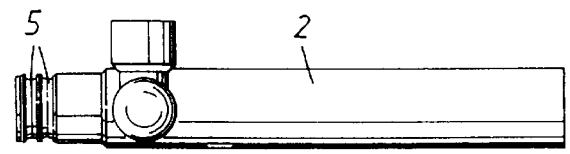
FIG. 2 shows different views of an inventive tubular busbar forming part of a busbar system and having a tubular connector part welded thereon.
Figure 2B:
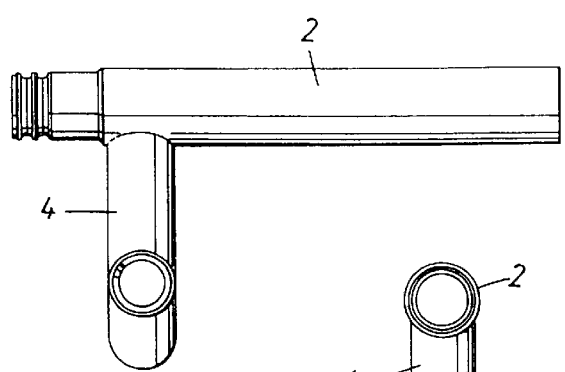
Figure 2C:
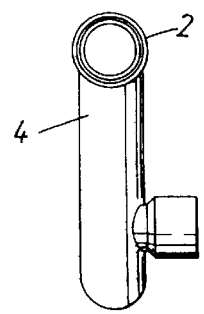
Figure 3A:
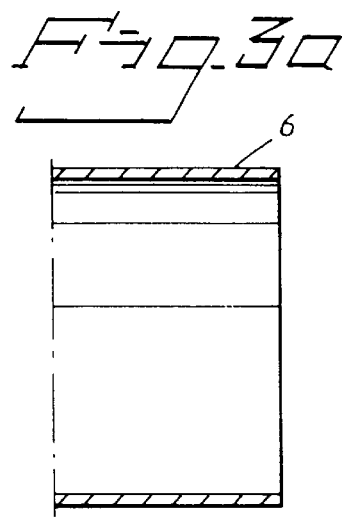
FIG. 3 illustrates in detail the connection, or jointing, of tubular busbars provided with contact elements and forming part of a busbar system.
Figure 3B:
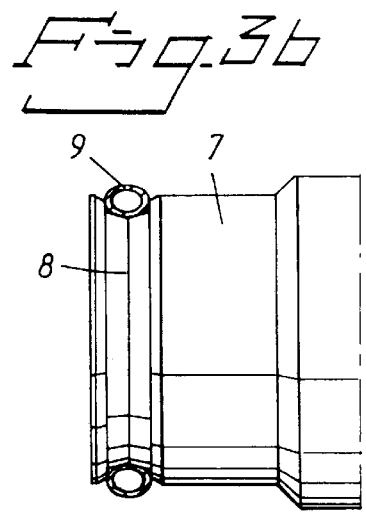
Figure 3C:
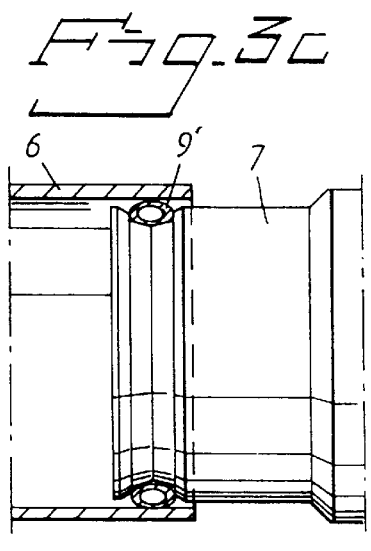
Figure 3D:
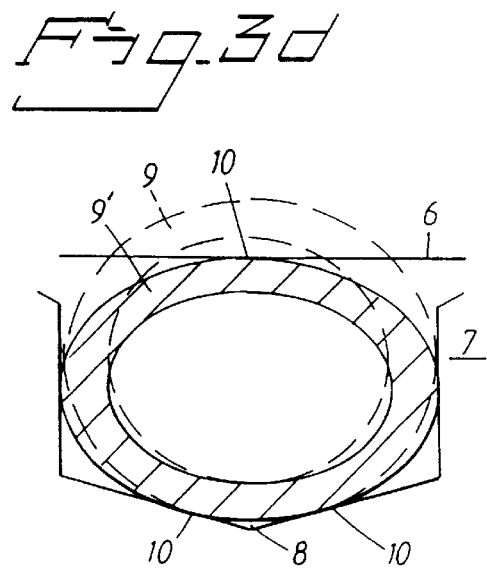

Shown in FIG. 1 is an air insulated switchgear 1 which includes a busbar system comprised of cylindrical tubes 2 preferably having a high copper content, where the uppermost tubular busbars are connected at 3 between the different switchgear units, wherein some of the protective plates of the switchgear have been omitted in FIG. 1 for the sake of illustration. In the illustrative systems of FIGS. 1 and 7 three switchgear units of modules are shown. In general terms, the system can be described as comprising a plurality, n, of modules, wherein n is an integer and n≧2, each module i, wherein 1≦i≦n, comprising switchgear equipment, and a plurality of busbars protruding side by side through the module i for connection with a consecutive module i+1. Thus, in the illustrative example of FIGS. 1 and 7, n=3. Tubular cross-pieces 4 for connection with circuit breaker connections, for instance, extend from the tubular busbars. FIG. 2 illustrates in detail a tubular busbar which has welded thereon a cross tube for connection to a circuit breaker connection for instance. One end of the tubular busbar, the so-called insertion end 7 is provided with grooves 5 for a contact element and a sealing element respectively. The other end of the busbar, the so-called receiving end 6, may have a smooth inner surface in the illustrated case. FIGS. 3a and b illustrates in detail a receiving end 6 and an insertion end 7 of a tubular busbar respectively, said insertion end 7 being provided with a circumferentially extending groove 8 and an electrically conductive contact element affixed therein. FIG. 3c shows the contact-element carrying insertion end 7 partially inserted into the receiving end 6, with the contact element 9' compressed. FIG. 3d is a schematic cross-sectional view of the contact element in said groove 8 prior to insertion, 9, and after insertion, 9', of an insertion end 6, and also illustrates the electrical contact points 10 in the groove on the insertion end an in the inner wall of the receiving end.

Busbar systems that are constructed from tubular busbars can be cooled /ventilated by passing air, optionally cooled air, through the tubes, wherein one or more sealing elements 11 may be fitted onto the insertion end in grooves provided herefor, or a sealing element 11 may be fitted on the insertion end and an outer sealing element 13 may be fitted over the connecting or jointing area. By efficiently sealing the joints, the space within the tube system may be totally shielded from the surrounding atmosphere, and the tubes may optionally be evacuated or filled with a gaseous substance particularly adapted for the field of use. Sealing of the joints will also provide protection against oxidation.

Figure 4A:
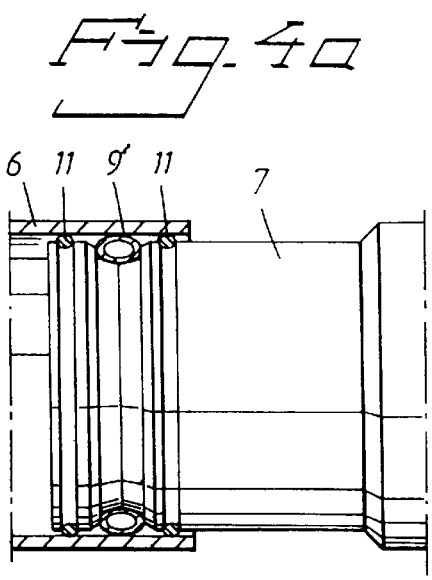
FIG. 4 illustrates in detail connected or jointed tubular busbars provided with contact elements and sealing elements and forming part of a busbar system in accordance with the invention.
Figure 4B:
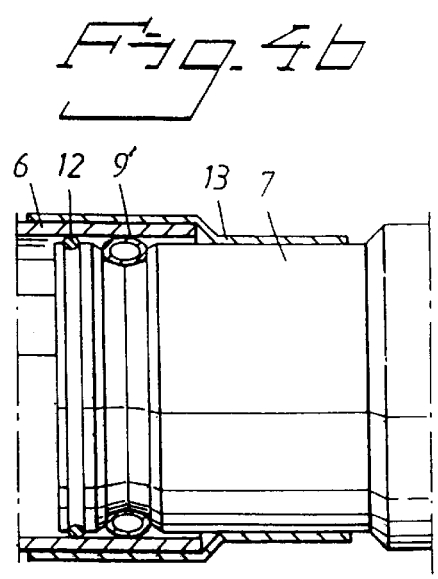

FIG. 4a is a schematic section view of the insertion end and receiving end of two jointed tubular busbars with a contact element 9 in the groove 8 and two sealing elements, such as O-rings 11, provided one on each side of the groove 8. FIG. 4b is a schematic section view of two mutually jointed tubular busbars with a contact element 9 provided in the groove 8, a sealing element, such as an O-ring 12, fixed in a groove, and an outer protecting and sealing element, such as a shrink sleeve 13, fitted over the receiving and insertion ends of the tubes.

FIG. 8 is a schematic section view of two mutually jointed tubular busbars 20. The joint has been accomplished with a tubular jointing means 22 which has contact elements 9 fitted in grooves at respective outer ends of the jointing means 22, and two sealing elements, such as O-rings 11, fixedly mounted in grooves on respective sides of the contact elements 9 between the tubular busbars 20 and the jointing means 22.

FIG. 9 is a schematic section view of two mutually jointed tubular busbars 20. The joint has been accomplished with the aid of a tubular jointing means 24 which has contact elements 9 fitted in respective grooves on the inside of the jointing means 24 at respective outer ends thereof.

The use of the illustrated jointing means 22, 24 provides greater flexibility when installing and disconnecting modules in and from an air insulated switchgear, because problems relating to tolerances are less pronounced when joining the tubular busbars together, for instance.

Figure 5:
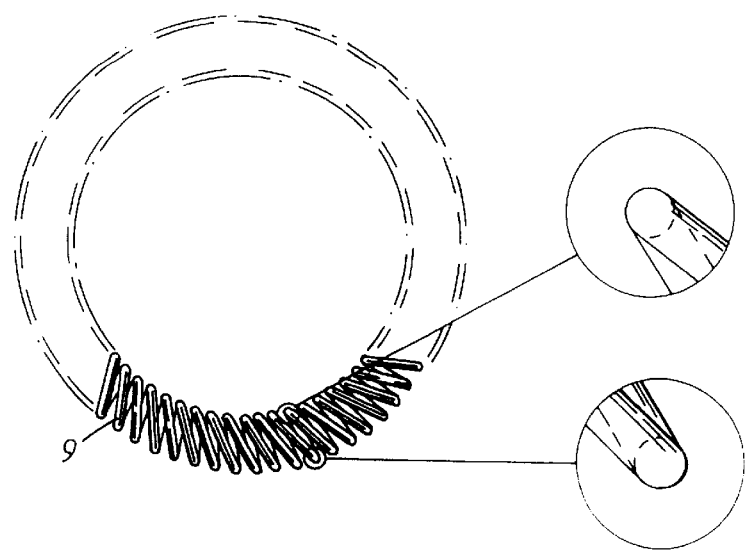
FIG. 5 illustrates the contact element of the FIG. 3 embodiment.
Figure 6A:
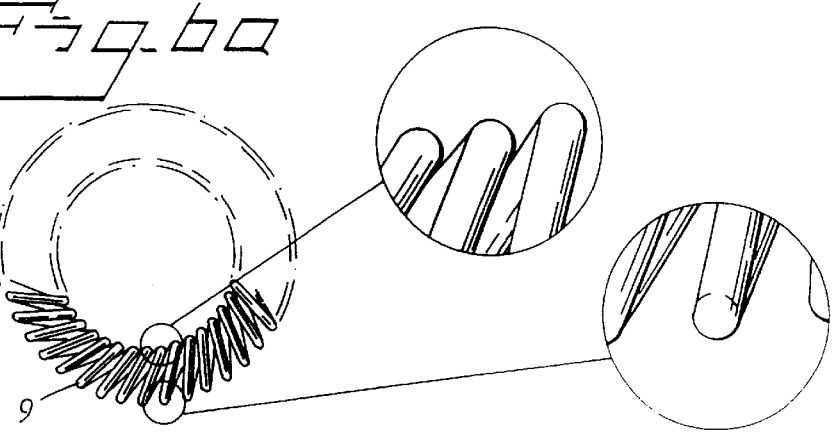
FIG. 6 illustrates alternative embodiments of a contact element.
Figure 6B:
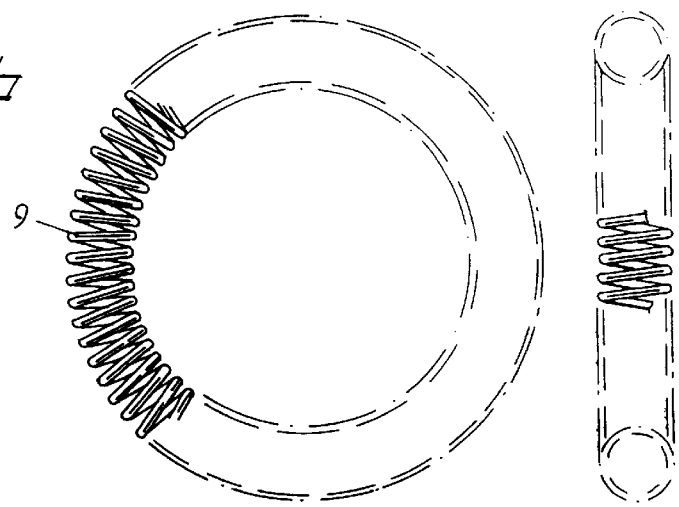

FIG. 5 illustrates an electrical contact element in the form of a circular and closed spirally wound spring intended for use in a busbar system. The spring may be made of a copper alloy, for instance beryllium copper, optionally plated with silver. In order to enhance radial compression of the contact element, the turns of the helix may be inclined to a greater or lesser extent. FIG. 6a illustrates another example of a contact element whose helical turns have an alternative inclination with greater deviation from the radial plane. The contact element can be adapted for different fields of use, by changing the pitch and the number of turns of the contact element, said turns preferably having an elliptical cross-section. FIG. 6b shows a contact element having essentially straight turns.

FIG. 7 shows the manner in which switchgear 1 having a busbar system comprised of tubes 2 is connected to each tube for cooling of a flexible tube 14 or hose which functions to deliver gas, optionally cooled gas, to the tubular busbars. Depending on the field of use, the cooling gas may be delivered with the aid of a fan, or may pass through the tubes by natural ventilation. Cooling by natural ventilation can be achieved by a "chimney effect" in principle in accordance with FIG. 7.

What is claimed is:

1. A busbar system for air insulated switchgear, characterized in that the busbar system is comprised of cylindrical tubular busbars (2), preferably having a high copper content; in that the tubular busbars have a busbar receiving end (6) and a busbar insertion end (7) enabling the tubular busbars to be joined together by inserting the insertion end into the receiving end; and in that a contact element (9) is mounted between the receiving end (6) and the insertion end (7) and functions to fix the tubular busbars together and establish an electric contact therebetween; and in that an outer protecting or sealing element is mounted over the join area of the respective receiving and insertion ends (6, 7) or mutually joined tubular busbars, said contact element (9) being a round and closed coil spring.

2. A busbar system according to claim 1, characterized in that the busbar insertion end (7) is provided with a circumferentially extending groove (8) in which the contact element (9) is affixed.

3. A busbar system according to claim 2, characterized in that the internal atmosphere of one of said tubular busbars or of several mutually connected tubular busbars (2) is isolated from the outer atmosphere surrounding said one tubular busbar or busbars.

4. A busbar system according to claim 2, characterized in that one of said tubular busbars or several mutually connected tubular busbars (2) is/are arranged to be throughpassed by gas by natural ventilation for cooling the busbar system.

5. A busbar system according to claim 1, characterized in that the internal atmosphere of one of said tubular busbars or of several mutually connected tubular busbars (2) is isolated from the outer atmosphere surrounding said one tubular busbar or busbars.

6. A busbar system according to claim 1, characterized in that one of said tubular busbars or several mutually connected tubular busbars (2) is/are arranged to be throughpassed by gas by natural ventilation for cooling the busbar system.

7. A busbar system for air insulated switchgear, characterized in that the busbar system is comprised of cylindrical tubular busbars (2), preferably having a high copper content; in that the tubular busbars have a busbar receiving end (6) and a busbar insertion end (7) enabling the tubular busbars to be joined together by inserting the insertion end into the receiving end; in that a contact element (9) is mounted between the receiving end (6) and the insertion end (7) and functions to fix the tubular busbars together and establish an electric contact therebetween; and in that an outer protecting or sealing element is mounted over the join area of the respective receiving and insertion ends (6, 7) of mutually joined tubular busbars; and in that a sealing element (11) is seated between the receiving end (6) and the insertion end (7) and functions to effect a seal between mutually joined tubular busbars, the busbar insertion end (1) being provided with one or more grooves for affixing the sealing element (11).

8. A busbar system according to claim 7, characterized in that the internal atmosphere of one of said tubular busbars or of several mutually connected tubular busbars (2) is isolated from the outer atmosphere surrounding said one tubular busbar or busbars.

9. A busbar system according to claim 8, characterized in that one of said tubular busbars or several mutually connected tubular busbars (2) is/are throughpassed by a gas for cooling the busbar system.

10. A busbar system according to claim 7, characterized in that one of said tubular busbars or several mutually connected tubular busbars (2) is/are arranged to be throughpassed by gas by natural ventilation for cooling the busbar system.

11. A busbar system for air insulated switchgear comprising tubes (20) for connection to one another by applying a tubular jointing means (22; 24) to the outer ends of the tubes (20); and in that an electric contact element (9) is seated between each outer end of the tubes (20) and the jointing means (22; 24) so as to achieve fixation and electrical contact between the tubes (20) when joining said tubes together; and in that an outer protecting or sealing element is mounted over the join area of the tubular jointing means (22; 24) and the outer ends of the tubes (20), the jointing means (22) having on the outside of each outer end thereof a groove in which a respective electric contact element (9) is affixed, and the outer diameter of the jointing means (22) being smaller than the inner diameter of the tubes (20).

12. A busbar system according to claim 11, characterized by a sealing element (11) seated between the tubes (20) and said jointing means (22;24) so as to establish a seal between said tubes when the tubes are connected together.

13. A busbar system for air insulated switchgear comprising tubes (20) for connection to one another by applying a tubular jointing means (22; 24) to the outer ends of the tubes (20); and in that an electric contact element (9) is seated between each outer end of the tubes (20) and the jointing means (22; 24) so as to achieve fixation and electrical contact between the tubes (20) when joining said tubes together; and in that an outer protecting or sealing element is mounted over the join area of the tubular jointing means (22; 24) and the outer ends of the tubes (20), the jointing means (24) including on the inside thereof at each outer end of said jointing means a groove in which the electric contact element (9) is affixed, and the inner diameter of the jointing means (24) being larger than the outer diameter of the tubes (20).

14. A busbar system according to claim 13, characterized by a sealing element (11) seated between the tubes (20) and said jointing means (22;24) so as to establish a seal between said tubes when the tubes are connected together.

15. A busbar system according to claim 14, characterized in that the jointing means (22) has provided on its outer surface at least two grooves in which respective sealing elements (11) are fixed.

16. A busbar system according to claim 14, characterized in that the jointing means (24) is provided on its inner surface with at least two grooves in which respective sealing elements (11) are fixed.

17. A method for erecting an air insulated switchgear comprising a plurality, n, of modules, wherein n is an integer and $n \geq 2$, each module, i, wherein $1 \leq i \leq n$, comprising switchgear equipment, and a plurality of busbars protruding side by side through said module i for connection with a consecutive module i+1, defining between each adjacent busbar a safety distance, wherein each busbar has a tubular shape with an insertion end which is plug shaped, and a receiving end which is sleeve shaped, said method comprises the steps:

to connect a module i and consecutive module i+1 by insertion of the plug shaped insertion ends of said busbars of said consecutive module i+1 into the sleeve shaped receiving ends of said busbars of said module i; and to repeat the above mentioned step for $1 \leq i \leq n$ until all said n modules are connected.

18. A method for erecting an air insulated switchgear according to claim 17, characterized in that said method also comprises the step:

to provide an electrically conductive contact element between each insertion end and each receiving end of said busbars.

19. A busbar system of an air insulated switchgear having a plurality, n, of modules, wherein n is an integer and $n \geq 2$, each module, i, wherein $1 \leq i \leq n$, comprising switchgear equipment, and a plurality of busbars protruding side by side through said module i for connection with a consecutive module i+1, defining between each adjacent busbar a safety distance, wherein each busbar has a tubular shape, thereby creating a smooth electric field permitting a narrower safety distance between adjacent busbars, wherein each busbar has an insertion end which is plug shaped, and a receiving end which is sleeve shaped, wherein said module i and said consecutive module i+1 are connected by insertion of the plug shaped insertion ends of said busbars of said consecutive module i+1 into the sleeve shaped receiving ends of said busbars of said module i, wherein this is performed for all said n modules.

20. A busbar system of an air insulated switchgear according to claim 19, characterized in that an electrically conductive contact element is disposed between each insertion end and each receiving end of said busbars.

21. A busbar system according to claim 20, characterized by an outer protecting or sealing element, in the form of a shrink sleeve (13), mounted over the join area of the respective receiving and insertion ends (6, 7) of mutually joined said tubular busbars.

22. A busbar system according to claim 20, characterized by a sealing element (11) seated between the receiving end (6) and the insertion end (7) and functioning to effect a seal between mutually joined tubular busbars.

23. A busbar system according to claim 19, characterized in that the internal atmosphere of one or of several mutually connected said tubular busbars (2) is isolated from the outer atmosphere surrounding said one or several busbars.

24. A busbar system according to claim 23, characterized in that said one or several mutually connected said tubular busbars (2) is/are throughpassed by a gas for cooling the busbar system.

25. A busbar system according to claim 19, characterized in that said one or several mutually connected said tubular busbars (2) are arranged to be throughpassed by natural ventilation for cooling the busbar system.

26. A busbar system of an air insulated switchgear having a plurality, n, of modules, wherein n is an integer and $n \geq 2$, each module, i, wherein $1 \leq i \leq n$, comprising switchgear equipment, and a plurality of busbars protruding side by side through said module i for connection with a consecutive module i+1, defining between each adjacent busbar a safety distance, wherein each busbar has a tubular shape, thereby creating a smooth electric field permitting a narrower safety distance between adjacent busbars, wherein each busbar has an insertion end which is plug shaped, and a receiving end which is sleeve shaped, wherein said module i and said consecutive module i+1 are connected by insertion of the plug shaped insertion ends of said busbars of said consecutive module i+1 into the sleeve shaped receiving ends of said busbars of said module i, wherein this is performed for all said n modules, wherein an electrically conductive contact element is disposed between each insertion end and each receiving end of said busbars, and wherein the contact element (9) is a round and closed coil spring.

27. A busbar system according to claim 26, characterized in that the busbar insertion end (7) is provided with a circumferentially extending grove (8) in which the contact element (9) is affixed.

28. A busbar system of an air insulated switchgear having a plurality, n, of modules, wherein n is an integer and $n \geq 2$, each module, i, wherein $1 \leq i \leq n$, comprising switchgear equipment, and a plurality of busbars protruding side by side through said module i for connection with a consecutive module i+1, defining between each adjacent busbar a safety distance, wherein each busbar has a tubular shape, thereby creating a smooth electric field permitting a narrower safety distance between adjacent busbars, wherein each busbar has an insertion end which is plug shaped, and a receiving end which is sleeve shaped, wherein said module i and said consecutive module i+1 are connected by insertion of the plug shaped insertion ends of said busbars of said consecutive module i+1 into the sleeve shaped receiving ends of said busbars of said module i, wherein this is performed for all said n modules, wherein an electrically conductive contact element is disposed between each insertion end and each receiving end of said busbars, wherein a sealing element (11) is seated between the receiving end (6) and the insertion end (7) and functions to effect a seal between mutually joined tubular busbars, and wherein the busbar insertion end (1) is provided with one or more grooves for affixing the sealing element (11).

* * * * *